US010352353B2

(12) United States Patent
McGregor

(10) Patent No.: US 10,352,353 B2
(45) Date of Patent: Jul. 16, 2019

(54) HINGE ASSEMBLY

(71) Applicant: Caterpillar Inc., Peoria, IL (US)

(72) Inventor: Scott Andrew McGregor, Lisle, IL (US)

(73) Assignee: Caterpillar Inc., Deerfield, IL (US)

(*) Notice: Subject to any disclaimer, the term of this patent is extended or adjusted under 35 U.S.C. 154(b) by 43 days.

(21) Appl. No.: 15/839,187

(22) Filed: Dec. 12, 2017

(65) Prior Publication Data

US 2019/0178285 A1    Jun. 13, 2019

(51) Int. Cl.
| | | |
|---|---|---|
| *E05D 1/06* | (2006.01) | |
| *F16C 11/04* | (2006.01) | |
| *E05D 1/04* | (2006.01) | |
| *E05D 11/00* | (2006.01) | |
| *E05D 11/10* | (2006.01) | |
| *E02F 9/08* | (2006.01) | |

(52) U.S. Cl.
CPC ............... *F16C 11/04* (2013.01); *E05D 1/04* (2013.01); *E05D 1/06* (2013.01); *E05D 11/0027* (2013.01); *E05D 11/1014* (2013.01); *E02F 9/08* (2013.01); *E05Y 2900/608* (2013.01)

(58) Field of Classification Search
CPC ......... Y10T 16/53613; Y10T 16/53615; Y10T 16/5362; Y10T 16/53625; F16C 11/04; E05D 1/04; E05D 1/06; E05D 11/0027; E05D 11/1014; E05D 7/12; E02F 9/08; E05Y 2900/608; B62D 25/10; B62D 25/105; B62D 25/12; B62D 25/163
See application file for complete search history.

(56) References Cited

U.S. PATENT DOCUMENTS

| | | | | | |
|---|---|---|---|---|---|
| 591,799 | A | * | 10/1897 | Brainard | E05C 17/22 292/262 |
| 634,369 | A | * | 10/1899 | Quimby | E05D 15/00 16/268 |
| 1,370,457 | A | * | 3/1921 | Lincoln | E05D 3/02 16/260 |
| 1,525,694 | A | * | 2/1925 | Sage | F16G 3/00 211/182 |
| 1,831,988 | A | * | 11/1931 | Aldeen | E05D 1/06 16/269 |
| 1,874,426 | A | * | 8/1932 | Berggren | E05D 1/06 16/269 |

(Continued)

FOREIGN PATENT DOCUMENTS

JP        2012241868       12/2012

*Primary Examiner* — Chuck Y Mah

(57) ABSTRACT

A hinge assembly including a flat plate and a bent plate is provided. The flat plate includes a first slot extending at least partially along a width of the flat plate and disposed substantially perpendicular with respect to a central axis of the flat plate. The bent plate includes a first portion, a second portion, and a third portion. The second portion includes a second slot extending at least partially along a width of the bent plate and disposed substantially perpendicular with respect to a central axis of the bent plate. The second slot is adapted to interconnect with respect to the first slot to pivotally move the hinge assembly between an open position and a close position. In the open position, the first portion of the bent plate is adapted to contact a first half section on a first side of the flat plate.

20 Claims, 20 Drawing Sheets

(56) References Cited

U.S. PATENT DOCUMENTS

| | | | | |
|---|---|---|---|---|
| 2,171,038 A * | 8/1939 | Martindale | A61G 17/04 | 16/264 |
| 2,332,017 A * | 10/1943 | Sedgwick | H02G 3/14 | 16/268 |
| 2,570,992 A * | 10/1951 | Thomas | E05D 1/06 | 16/269 |
| 2,675,925 A * | 4/1954 | Skar | A47B 96/027 | 108/135 |
| 2,722,034 A * | 11/1955 | May | E05D 1/06 | 16/268 |
| 2,767,032 A * | 10/1956 | Mitchell | B05C 21/00 | 16/269 |
| 2,794,208 A * | 6/1957 | Scroggins | E05D 1/04 | 16/267 |
| 2,857,618 A | 10/1958 | Jordan | | |
| 2,952,328 A * | 9/1960 | Steiner | B62D 25/105 | 180/69.2 |
| 3,348,259 A * | 10/1967 | Wilhelmsen | E05D 1/06 | 16/269 |
| 3,562,955 A * | 2/1971 | Blomgren | E05D 1/02 | 220/832 |
| 3,815,701 A * | 6/1974 | Mayhew | B62D 25/12 | 16/268 |
| 3,878,585 A * | 4/1975 | Morris | E05D 1/06 | 16/225 |
| 4,041,571 A * | 8/1977 | Blevins | B23P 11/00 | 16/268 |
| 4,079,498 A * | 3/1978 | Blevins | B23P 11/00 | 16/260 |
| 4,284,118 A | 8/1981 | Ceron | | |
| 4,437,529 A * | 3/1984 | Fralish | B62D 25/10 | 16/268 |
| 4,724,580 A | 2/1988 | Paskerian | | |
| 5,531,486 A * | 7/1996 | Parker | E05D 1/06 | 16/268 |
| 5,691,503 A * | 11/1997 | Kato | H02B 1/38 | 174/375 |
| 5,984,566 A * | 11/1999 | Blaha | A47B 87/002 | 16/269 |
| 6,019,269 A | 2/2000 | Mullet et al. | | |
| 6,941,616 B2 | 9/2005 | Roy | | |

\* cited by examiner

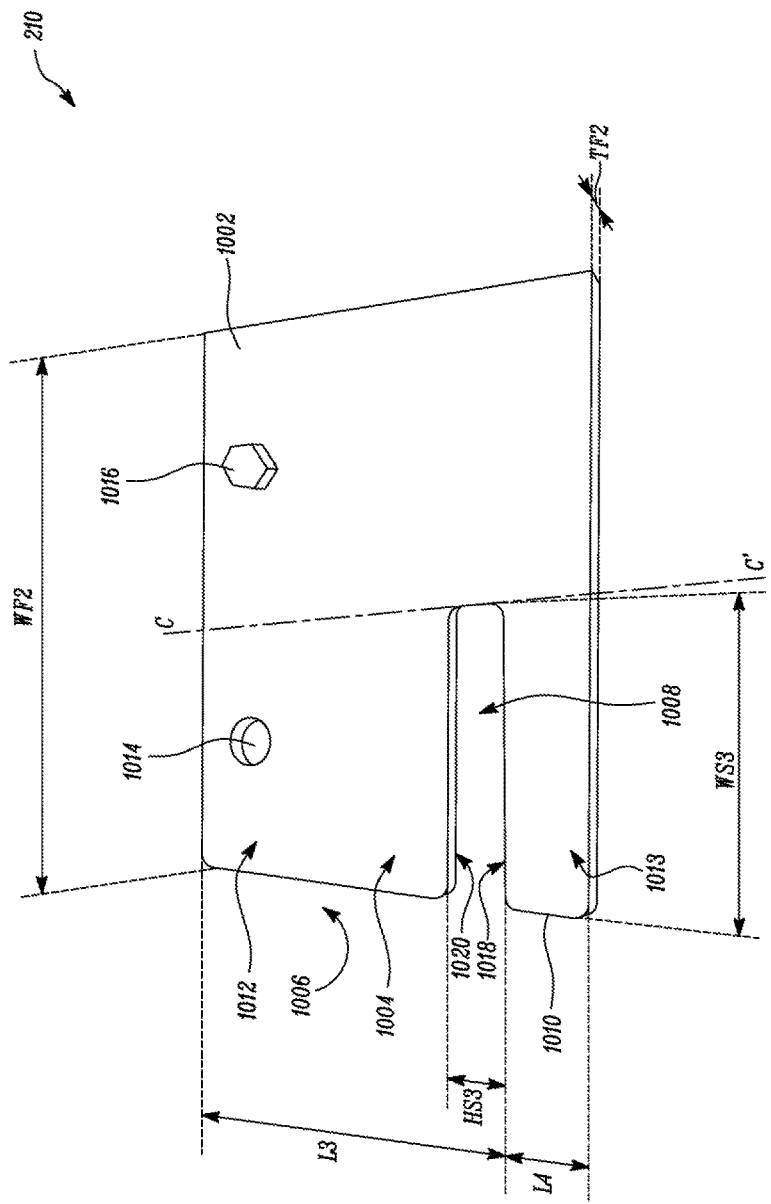

HINGE ASSEMBLY

TECHNICAL FIELD

The present disclosure relates to a hinge assembly. More particularly, the present disclosure relates to a hinge assembly for a machine.

A machine, such as a wheel loader, includes a guard plate typically mounted on a bottom portion of a frame of the machine. The guard plate may be provided in order to protect internal components of the machine against damage from external objects and/or to limit infiltration of debris within the machine. During a service interval of the machine, the guard plate may be opened in order to access the internal components. In many situations, the guard plate may be pivotally mounted to the frame. As such, the guard plate may be pivotally opened with respect to the frame in order to access the internal components of the machine.

The guard plate may be typically mounted to the machine using a hinge assembly. However, the hinge assembly may include a heavy duty, pin and tube type design which may require specialized manufacturing process and further machining, welding, tooling, and so on during installation of the hinge assembly on the machine. This may increase component cost and complexity, increase installation/replacement duration, increase machine downtime, and so on. Hence, there is a need for an improved hinge assembly.

U.S. Pat. No. 4,724,580 describes a hinge having a pair of hinge plates which are connectable to each other for limited relative rotation. Each plate includes a generally flat base portion and a connecting portion disposed at an end of the base portion. The connecting portion of one of the hinge plates includes a socket extending generally transverse of the base portion. The socket is defined in part by the flat base portion and in part by a socket wall connected at one end thereof to the base portion. The other end of the socket wall is a free end that faces generally towards and is spaced slightly from the base portion. The connecting portion of the other hinge plate is generally flat and includes a first portion that extends generally side to side of the hinge plate and is sized and adapted to fit within the socket, and a second portion intermediate the first portion and the base portion that defines a cut-out for receiving the free end of the socket wall of the one hinge plate. The gap between the free end of the one hinge plate and the base portion thereof is less than the thickness of the first portion of the connecting portion of the other hinge plate.

SUMMARY OF THE DISCLOSURE

In an aspect of the present disclosure, a hinge assembly is provided. The hinge assembly includes a flat plate defining a first side and a second side disposed opposite to the first side. The flat plate includes a first slot extending at least partially along a width of the flat plate. The first slot is disposed substantially perpendicular with respect to a central axis of the flat plate. The hinge assembly also includes a bent plate defining a first side and a second side disposed opposite to the first side. The bent plate extends between each of the first side and the second side of the flat plate. The bent plate includes a first portion. The bent plate also includes a second portion extending away from the first portion and defines a first transition region therebetween. The second portion is inclined at a first angle with respect to the first portion. The second portion includes a second slot extending at least partially along a width of the bent plate. The second slot is disposed substantially perpendicular with respect to a central axis of the bent plate. The second slot is adapted to interconnect with respect to the first slot provided in the flat plate to pivotally move one of the bent plate and the flat plate with respect to the other between an open position and a close position. The bent plate further includes a third portion extending away from the second portion and defines a second transition region therebetween. The third portion is inclined at a second angle with respect to the second portion. In the open position, the first portion of the bent plate is adapted to, at least partially, contact a first half section on the first side of the flat plate.

In another aspect of the present disclosure, a guard assembly for a machine is provided. The guard assembly includes a guard plate adapted to be pivotally coupled to a frame of the machine. The guard assembly also includes at least one hinge assembly adapted to pivotally couple the guard plate to the frame of the machine. The at least one hinge assembly includes a flat plate adapted to be coupled to any one of the frame and the guard plate. The flat plate defines a first side and a second side disposed opposite to the first side. The flat plate includes a first slot extending at least partially along a width of the flat plate. The first slot is disposed substantially perpendicular with respect to a central axis of the flat plate. The at least one hinge assembly also includes a bent plate adapted to be coupled to other of the frame and the guard plate. The bent plate defines a first side and a second side disposed opposite to the first side. The bent plate extends between each of the first side and the second side of the flat plate. The bent plate includes a first portion. The bent plate also includes a second portion extending away from the first portion and defines a first transition region therebetween. The second portion is inclined at a first angle with respect to the first portion. The second portion includes a second slot extending at least partially along a width of the bent plate. The second slot is disposed substantially perpendicular with respect to a central axis of the bent plate. The second slot is adapted to interconnect with respect to the first slot provided in the flat plate to pivotally move one of the bent plate and the flat plate with respect to the other between an open position and a close position. The bent plate further includes a third portion extending away from the second portion and defines a second transition region therebetween. The third portion is inclined at a second angle with respect to the second portion. In the open position, the first portion of the bent plate is adapted to, at least partially, contact a first half section on the first side of the flat plate.

In yet another aspect of the present disclosure, a method of pivotally mounting a guard plate to a frame of a machine using at least one hinge assembly is provided. The at least one hinge assembly includes a flat plate and a bent plate. The method includes mounting the flat plate to any one of the frame of the machine and the guard plate. The method includes removably mounting the guard plate to the frame of the machine. The method also includes slidably interconnecting a first slot of the flat plate with respect to a second slot of the bent plate such that a first portion of the bent plate is disposed adjacent to a first side of the flat plate. Also, a second portion of the bent plate is disposed within the first slot of the flat plate. Further, a third portion of the bent plate is disposed adjacent to a second side of the flat plate. The method further includes mounting the bent plate to other of the frame of the machine and the guard plate.

Other features and aspects of this disclosure will be apparent from the following description and the accompanying drawings.

BRIEF DESCRIPTION OF THE DRAWINGS

FIG. 10 is a perspective view of a portion of a second hinge assembly, according to one embodiment of the present disclosure;

DETAILED DESCRIPTION

Figure 1:
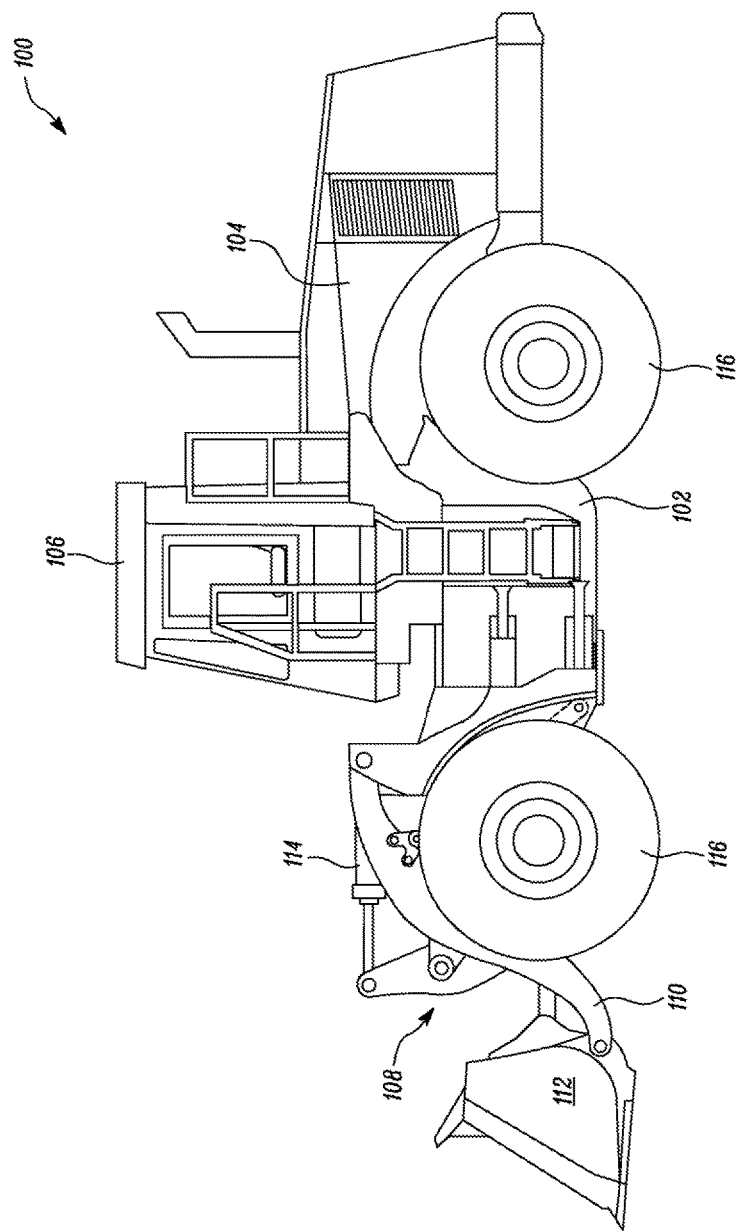
FIG. 1 is a side view of an exemplary machine, according to one embodiment of the present disclosure.

Wherever possible, the same reference numbers will be used throughout the drawings to refer to the same or the like parts. Referring to FIG. 1, an exemplary machine 100 is illustrated. More specifically, the machine 100 is a wheel loader. In other embodiments, the machine 100 may be any other machine, such as a backhoe loader, a tracked loader, a track type tractor, an off-highway truck, an on-highway truck, an articulated truck, and the like. The machine 100 may be employed in any industry including, but not limited to, construction, agriculture, mining, transportation, material handling, waste management, and forestry.

The machine 100 includes a frame 102. The frame 102 is adapted to support various components of the machine 100 thereon. The machine 100 includes an enclosure 104 mounted on the frame 102. The enclosure 104 is adapted to enclose a power source (not shown) therein. The power source may be any power source known in the art, such as an internal combustion engine, batteries, motor, and the like. The power source is adapted to provide power to the machine 100 for operational and mobility requirements. The machine 100 includes an operator cabin 106 mounted on the frame 102. The operator cabin 106 includes one or more controls (not shown), such as joysticks, pedals, levers, buttons, switches, knobs, audio visual devices, operator consoles, a steering wheel, and the like. The controls are adapted to enable an operator to control the machine 100 on ground.

The machine 100 also includes a linkage assembly 108 movably mounted to the frame 102. The linkage assembly 108 includes arm 110 movably mounted to the frame 102, and an implement 112 movably mounted to the arm 110. The linkage assembly 108 also includes one or more hydraulic actuators 114 in order to provide movement to the linkage assembly 108 around the machine 100 during an operation thereof. The machine 100 further includes one or more ground engaging members 116 rotatably coupled to the frame 102. The ground engaging members 116 are adapted to support and provide mobility to the machine 100 on the ground.

Figure 2:
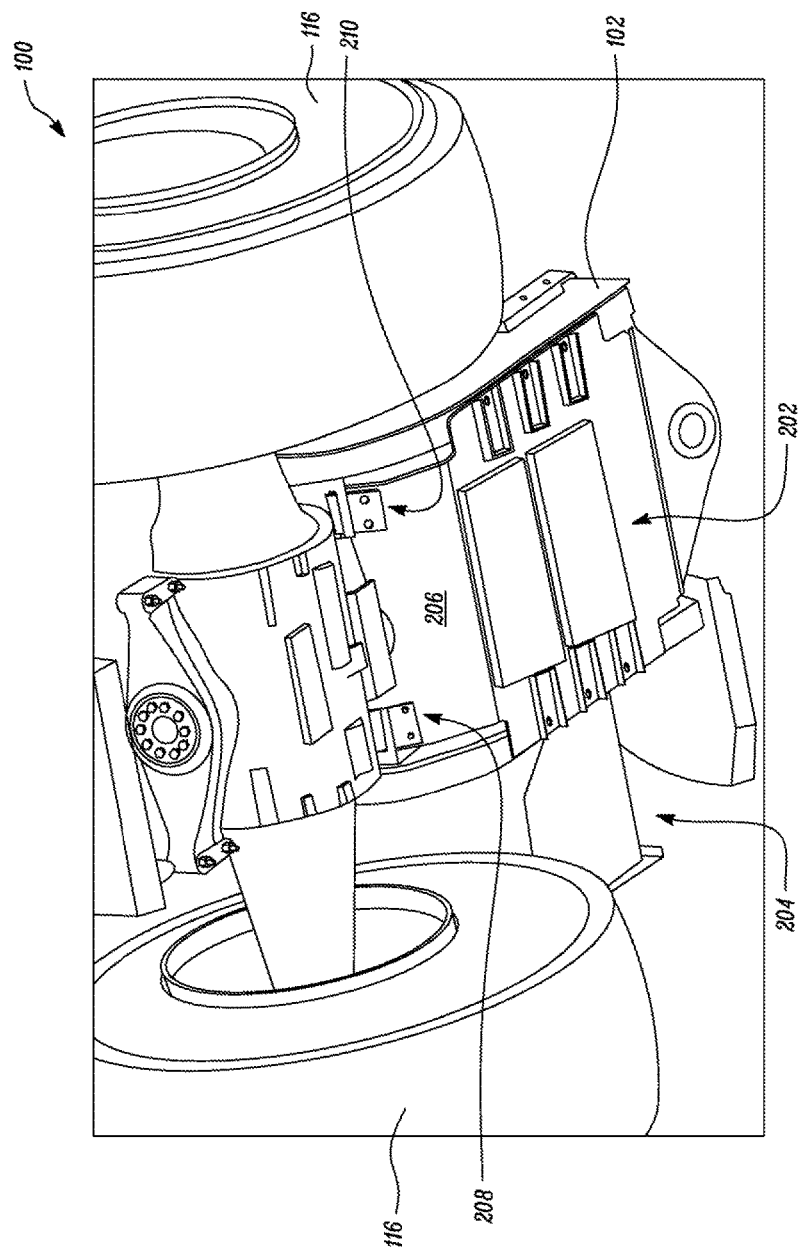
FIG. 2 is a partial perspective view of a bottom portion of the machine of FIG. 1, according to one embodiment of the present disclosure.

Referring to FIG. 2, the machine 100 includes a guard assembly 202 mounted on a bottom portion 204 of the frame 102. The guard assembly 202 includes a guard plate 206 pivotally mounted to the frame 102. The guard plate 206 is adapted to limit entry of foreign material, such as soil, debris, and so on, into an internal space of the machine 100. The guard plate 206 is also adapted to limit damage to internal components of the machine 100 from impact against objects, debris, rocks, and so on.

The guard assembly 202 also includes one or more hinge assemblies, such as a first hinge assembly 208 and a second hinge assembly 210. Each of the first hinge assembly 208 and the second hinge assembly 210 is adapted to pivotally mount the guard plate 206 to the frame 102 of the machine 100. The first hinge assembly 208 will now be explained with reference to FIGS. 3 to 9, and the second hinge assembly 210 will be explained with reference to FIGS. 10 to 13. It should be noted that, in other embodiments, the guard assembly 202 may include single or multiple hinge assemblies, based on application requirements.

Figure 3:
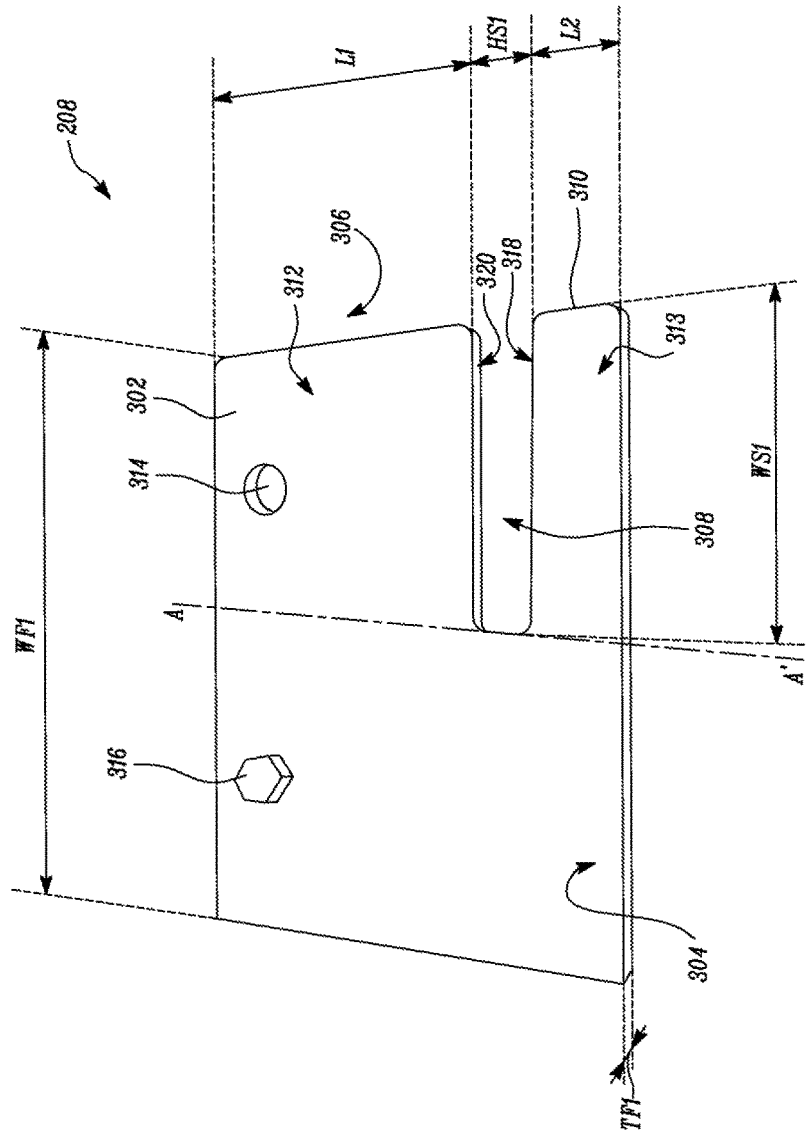
FIG. 3 is a perspective view of a portion of a first hinge assembly, according to one embodiment of the present disclosure.

Referring to FIG. 3, a first flat plate 302 of the first hinge assembly 208 is illustrated. The first flat plate 302 includes a substantially flat and rectangular configuration defining a first central axis A-A' and a width "WF1" thereof. The first flat plate 302 defines a first side 304 and a second side 306 opposite the first side 304, and defines a thickness "TF1" therebetween. The first flat plate 302 also defines a first half section 312 and a second half section 313 thereof. The first flat plate 302 also includes a first slot 308 extending substantially along the width "WF1" of the first flat plate 302. The first slot 308 includes a first inner surface 318 and a second inner surface 320. The first slot 308 defines a width "WS1" and a height "HS1" thereof.

In the illustrated embodiment, the first slot 308 extends from an edge 310 of the first flat plate 302 substantially up to the first central axis A-A'. In other embodiments, an actual width "WS1" of the first slot 308 may vary, based on application requirements. Also, the first slot 308 is disposed substantially perpendicular with respect to the first central axis A-A'. In the illustrated embodiment, the first slot 308 is located in the second half section 313 of the first flat plate 302 defining a first length "L1" and a second length "L2" of the first flat plate 302. In other embodiments, the location of the first slot 308 in the first flat plate 302 may vary, based on application requirements.

Figure 16:
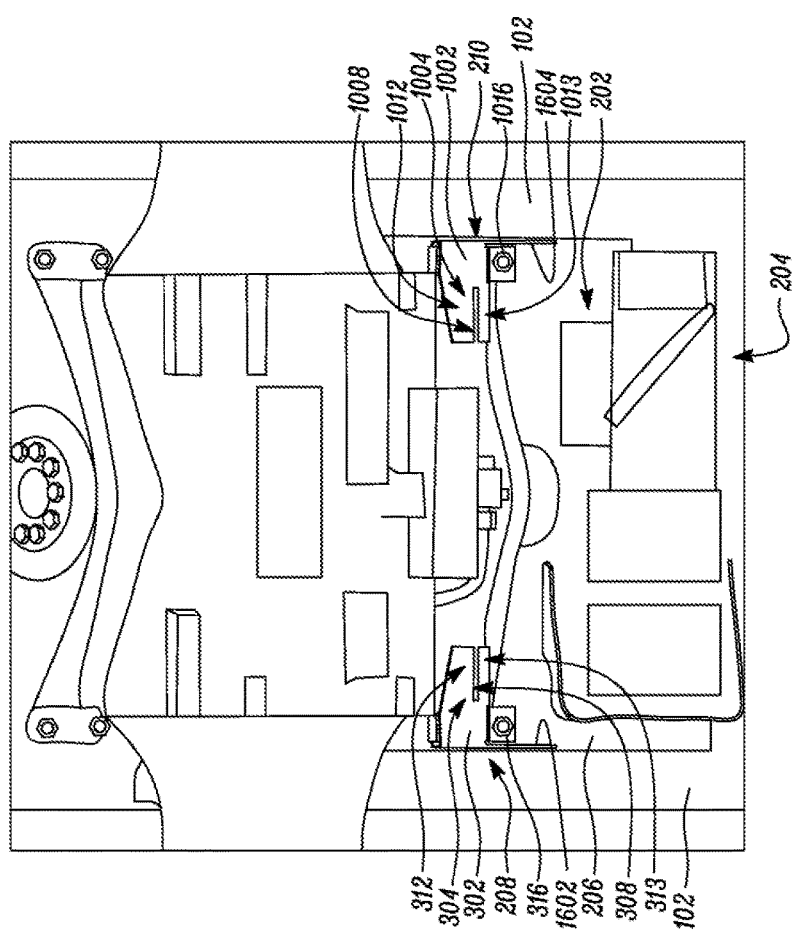
FIG. 16 is a partial perspective view of the bottom portion of the machine of FIG. 1 showing the portion of the first hinge assembly of FIG. 3 and the portion of the second hinge assembly of FIG. 10 installed thereon, according to one embodiment of the present disclosure.

The first flat plate 302 further includes one or more first holes 314 provided therein. The first holes 314 are adapted to receive first fasteners 316 therein in order to mount the first flat plate 302 to the frame 102 of the machine 100. In some embodiments (shown in FIG. 16), the first flat plate 302 may be mounted to the frame 102 of the machine 100 using a first mounting plate 1602. In such a situation, the first holes 314 may be provided on the first mounting plate 1602, and the first mounting plate 1602 may be mounted to the frame 102 using the first fasteners 316.

Figure 4:
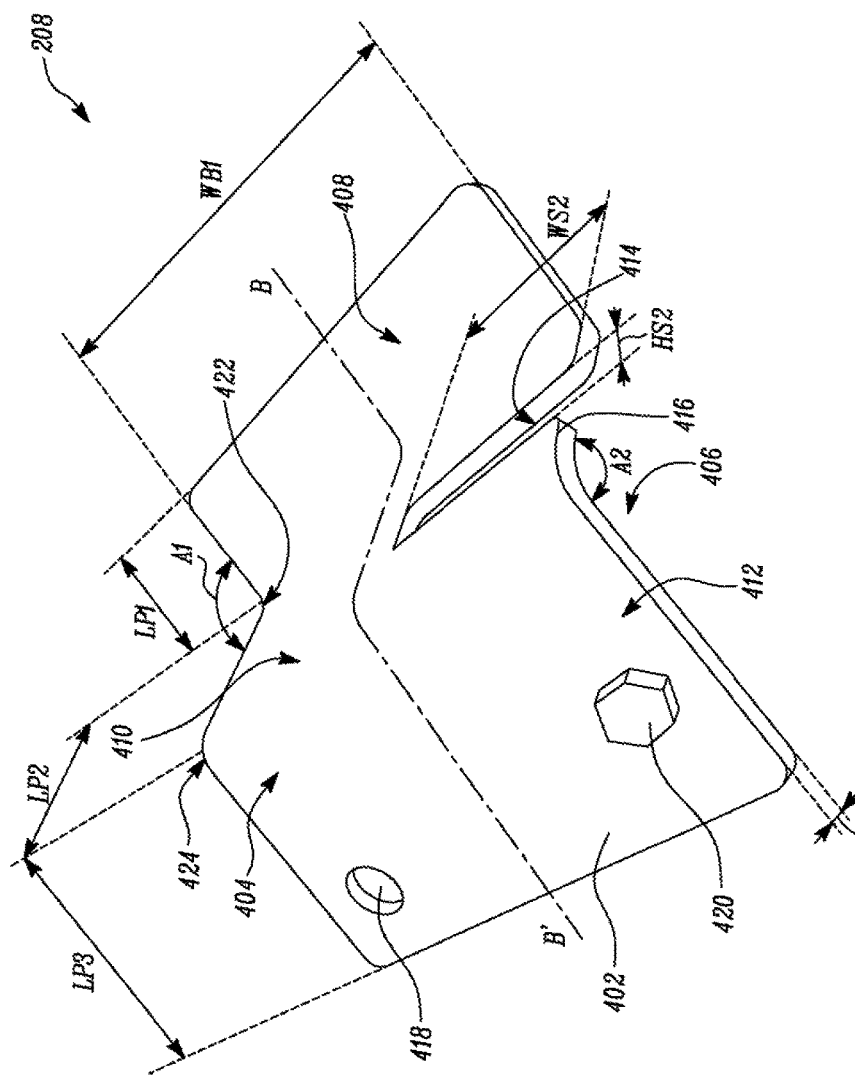
FIG. 4 is a perspective view of another portion of the first hinge assembly of FIG. 3, according to one embodiment of the present disclosure.
Figure 5:
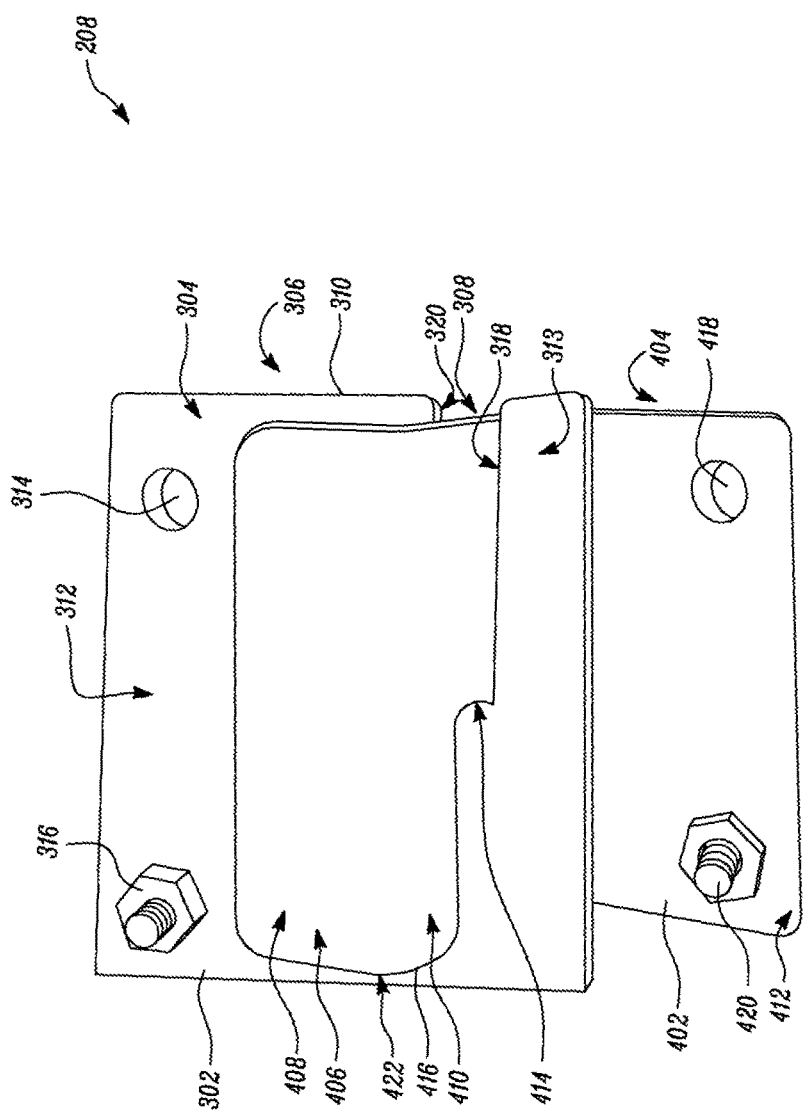
FIG. 5 is a front perspective view of the first hinge assembly of FIGS. 3 and 4 in an interconnected position, according to one embodiment of the present disclosure.
Figure 6:
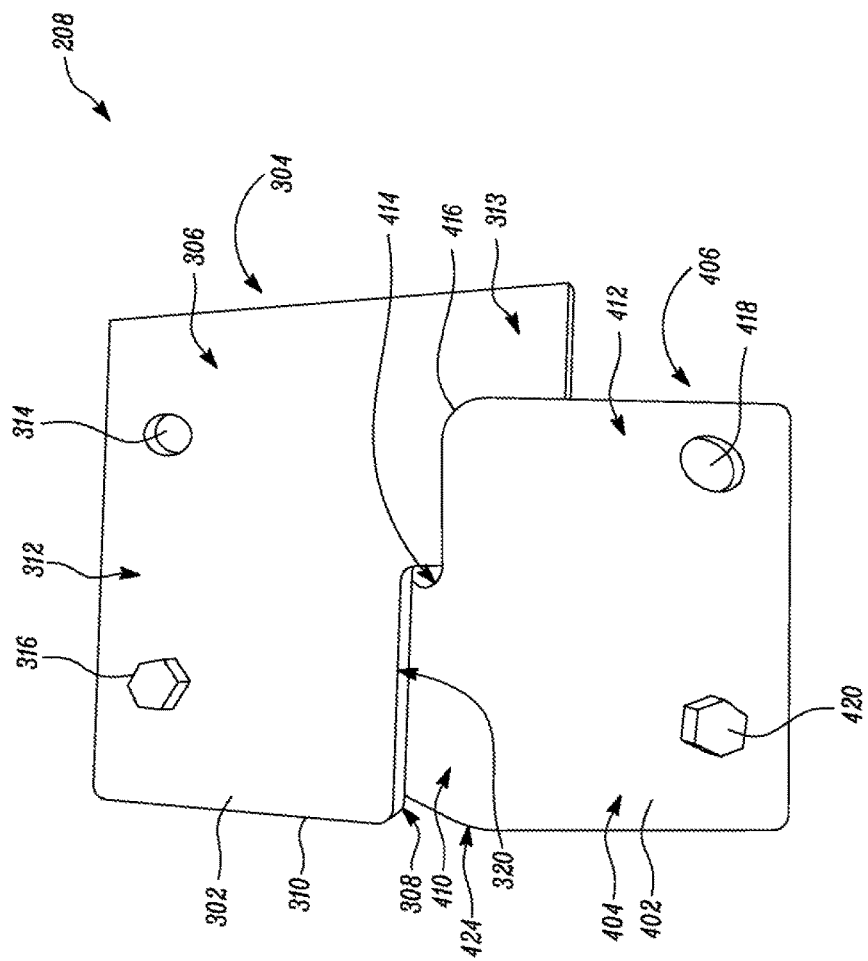
FIG. 6 is a rear perspective view of the first hinge assembly of FIG. 5, according to one embodiment of the present disclosure.

Referring to FIG. 4, a first bent plate 402 of the first hinge assembly 208 is illustrated. The first bent plate 402 includes a substantially angled and rectangular configuration defining a second central axis B-B' and a width "WB1" thereof. The first bent plate 402 includes a first side 404 and a second side 406 opposite the first side 404, and defines a thickness "TB1" therebetween. The first bent plate 402 also includes a first portion 408, a second portion 410, and a third portion 412. The first portion 408 defines a length "LP1" thereof.

The second portion 410 is connected to and extends away from the first portion 408, and defines a first transition region 422 therebetween. The second portion 410 defines a length "LP2" thereof. Also, the second portion 410 is inclined at a first angle "A1" with respect to the first portion 408. The third portion 412 is connected to and extends away from the second portion 410, and defines a second transition region 424. The third portion 412 defines a length "LP3" thereof. Also, the third portion 412 is inclined at a second angle "A2" with respect to the second portion 410. In some embodiments (not shown), the third portion 412 may be coplanar with respect to the second portion 410 such that the second angle "A2" may be approximately 180°, based on application requirements. In the illustrated embodiment, the second angle "A2" is substantially equal to the first angle "A1".

As such, the third portion 412 is substantially parallel with respect to the first portion 408. In other embodiments, the second angle "A2" may vary with respect to the first angle "A1", based on application requirements. The first bent plate 402 also includes a second slot 414 provided in the second portion 410 and extending substantially along the width "WB1" of the first bent plate 402. The second slot 414 defines a width "WS2" and a height "HS2" thereof. In the illustrated embodiment, the second slot 414 extends from an edge 416 of the second portion 410 of the first bent plate 402 substantially up to the second central axis B-B'.

In other embodiments, an actual width "WS2" of the second slot 414 may vary, based on application requirements. Also, the second slot 414 is disposed substantially perpendicular with respect to the second central axis B-B'. The first bent plate 402 further includes one or more second holes 418 provided in the third portion 412. The second holes 418 are adapted to receive second fasteners 420 therein in order to mount the first bent plate 402 to the guard plate 206 via the third portion 412.

Referring to FIGS. 5 to 8, different views of the first hinge assembly 208 in an interconnected position are illustrated. Each of the first slot 308 of the first flat plate 302 and the second slot 414 of the first bent plate 402 is interconnected with respect to one another in order to form the first hinge assembly 208. In the interconnected position, the first bent plate 402 extends between each of the first side 304 and the second side 306 of the first flat plate 302. More specifically, in the interconnected position, each of the first portion 408 and the first transition region 422 of the first bent plate 402 is disposed, adjacent to and in association with the first half section 312 on the first side 304 of the first flat plate 302.

Also, in the interconnected position, the second portion 410 of the first bent plate 402 is disposed within the first slot 308 such that the first inner surface 318 of the first slot 308 is adapted to contact the second portion 410 on the second side 406 of the first bent plate 402. The second slot 414 is disposed in association with each of the first side 304 and the second side 306 of the first flat plate 302. Further, in the interconnected position, each of the third portion 412 and the second transition region 424 of the first bent plate 402 is disposed adjacent to and in association with the second half section 313 on the second side 306 of the first flat plate 302.

Figure 7:
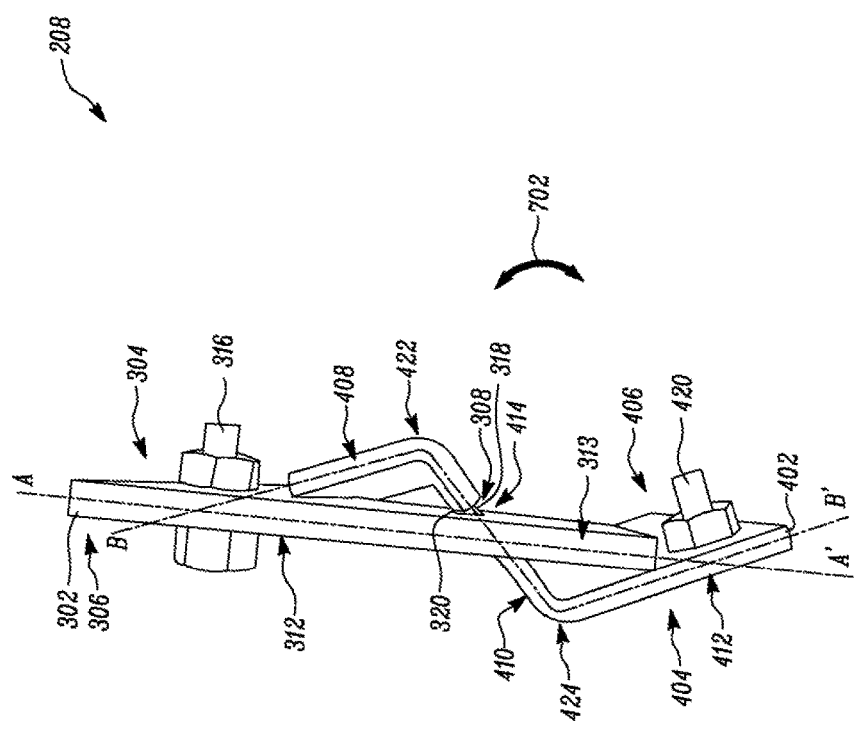
FIG. 7 is a side perspective view of the first hinge assembly of FIG. 5, according to one embodiment of the present disclosure.
Figure 8:
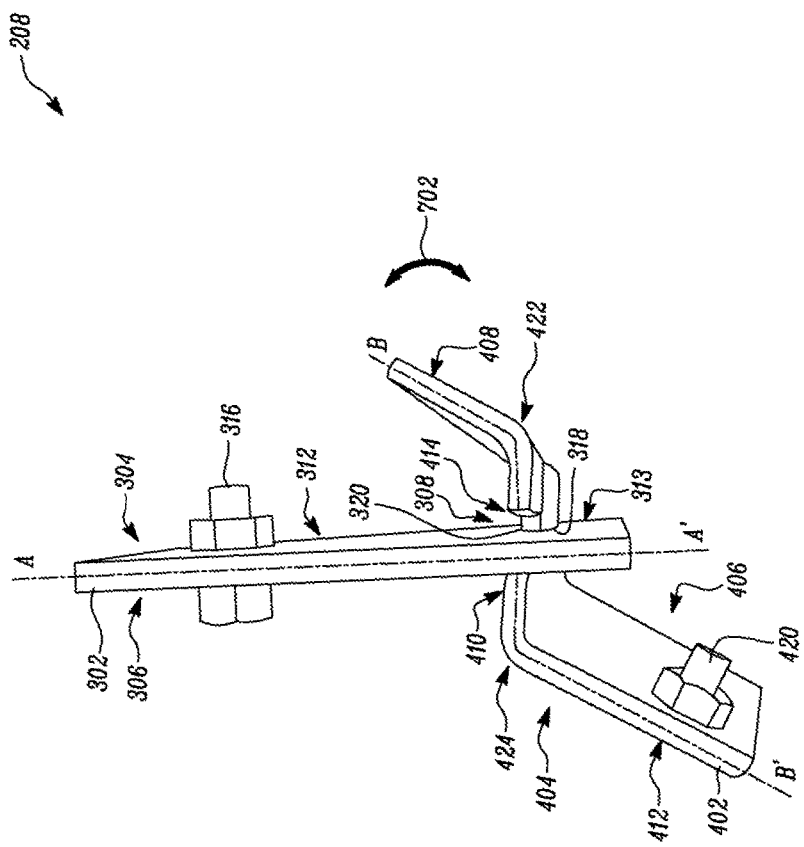
FIG. 8 is another side perspective view of the first hinge assembly of FIG. 5, according to one embodiment of the present disclosure.

One of the first flat plate 302 and the first bent plate 402 is adapted to pivotally move with respect to the other through each of the first slot 308 and the second slot 414 respectively in a direction 702 (shown in FIGS. 7 and 8). Accordingly, the first hinge assembly 208 is adapted to pivotally move between an open position (shown in FIG. 7) and a close position. (shown in FIG. 8). It should be noted that a configuration, dimension, location, and/or orientation of each of the first slot 308 and the second slot 414 may be such that the first hinge assembly 208 may support at least a quarter weight of the guard plate 206 in the open position without yielding.

Referring to FIGS. 7 and 8, the length "L1" of the first flat plate 302 is substantially greater than the length "LP1" of the first portion 408 of the first bent plate 402. In the open position, based on the first angle "A1", the first portion 408 is adapted to contact a portion of the first flat plate 302, such as the first half section 312 on the first side 304 thereof. The contacting of the first portion 408 with respect to the first side 304 of the first flat plate 302 provides a limit for maximum pivotal movement of the first bent plate 402 with respect to the first flat plate 302 and vice versa. As such, based on values of each of the first angle "A1" and the length "LP1" of the first portion 408, a range of the pivotal movement of the first bent plate 402 with respect to the first flat plate 302 and vice versa may be configured, based on application requirements.

Also, in the open position, the first transition region 422 is disposed adjacent to the first half section 312 on the first side 304 of the first flat plate 302. Additionally, in the open position, the second inner surface 320 of the first slot 308 of the first flat plate 302 is adapted to contact the second portion 410 on the first side 404 of the first bent plate 402. Further, a location of the first holes 314 and/or the first fasteners 316 on the first half section 312 of the first flat plate 302 is such that the first holes 314 and/or the first fasteners 316 may limit interference with the first portion 408 in the open position.

The length "L2" of the first flat plate 302 is substantially smaller than the length "LP3" of the third portion. 412 of the first bent plate 402. In some embodiments, in the open position, based on the second angle "A2", the third portion 412 may be adapted to contact a portion of the first flat plate 302, such as the second half section 313 on the second side 306 thereof. The second angle "A2" may be configured in order to mate the third portion 412 with the guard plate 206 in an installed position of the guard plate 206 on the machine 100. Also, a location of the second holes 418 and/or the second fasteners 420 on the third portion 412 of the first bent plate 402 is such that the second holes 418 and/or the second fasteners 420 may limit interference with the second half section 313 of the first flat plate 302 in the open position.

Further, in the illustrated embodiment, in the close position, the second portion 410 of the first bent plate 402 is adapted to be substantially perpendicular with respect to the first flat plate 302. In other embodiments, in the close position, the second portion 410 of the first bent plate 402 may be adapted to be inclined at any angle with respect to the first flat plate 302, based on application requirements.

Figure 9B:
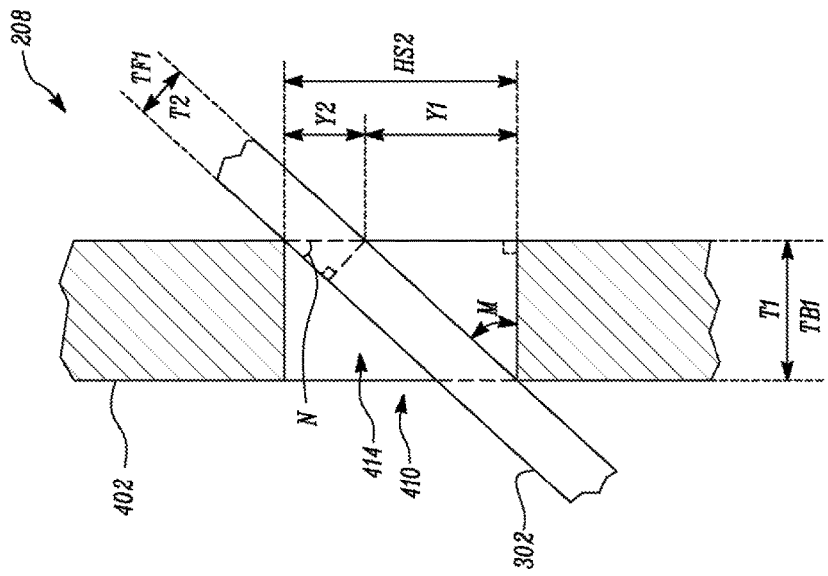
FIGS. 9A and 9B are schematic representations of the first hinge assembly of FIG. 5, according to one embodiment of the present disclosure.
Figure 9A:
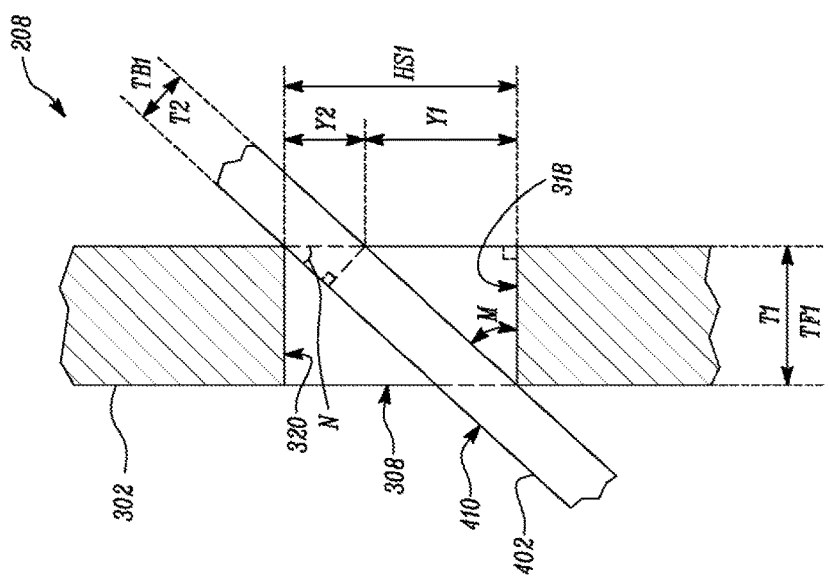

Referring to FIGS. 9A and 9B3, exemplary schematic representations of the first hinge assembly 208 is illustrated. The dimension of each of the first flat plate 302 and the first bent plate 402 may govern a maximum pivotal angle "M" of the first flat plate 302 and the first bent plate 402 with respect to one another. The height "HS1" of the first slot 308 of the first flat plate 302 and the height "HS2" of the second slot 414 of the first bent plate 402 may be determined based on the thickness "TF1" of the first flat plate 302 and the thickness "TB1" of the first bent plate 402, and the maximum pivotal angle "M".

For example, referring to FIG. 9A, in order to calculate the height "HS1" of the first slot 308 when:

$T1 = TF1 = 6$ units (exemplary), $T2 = TB1 = 8$ units (exemplary), and $M = 30°$ (exemplary), Accordingly, $N = 90 - 30° = 60°$ $Y1 = (T1)*\tan(M) = (TF1)*\tan(M) = 6*\tan(30°) = 3.464$ units $Y2 = (T2)/\sin(N) = (TB1)/\sin(N) = 8/\sin(60°) = 9.237$ units Therefore, $HS1 = Y1 + Y2 = 3.464 + 9.237 = 12.70$ units Referring to FIG. 9B, in order to calculate the height "HS2" of the second slot 414 when:

$T1 = TB1 = 8$ units (exemplary), $T2 = TF1 = 6$ units (exemplary), and $M = 30°$ (exemplary), Accordingly, $N = 90° - 30° = 60°$ $Y1 = (T1)*\tan(M) = (TB1)*\tan(M) = 8*\tan(30°) = 4.618$ units $Y2 = (12)/\sin(N) = (TF1)/\sin(N) = 6/\sin(60°) = 6.928$ units Therefore, $HS2 = Y1 + Y2 = 3.464 + 9.237 = 11.546$ units It should be noted that the calculation of the height "HS1" and the height "HS2" and the numerical values shown herein are merely exemplary and have been used for the purpose of explanation, and may vary based on application requirements. Further, the first angle "A1" and the length "LP1" of the first portion 408 of the first bent plate 402 is based on a degree of movement of the first bent plate 402 between the open position and the close position. More specifically, the first angle "A1" and the length "LP1" may be such that the first portion 408 may contact the first half section 312 on the first side 304 of the first flat plate 302 at the maximum pivotal angle "M". Also, in some embodiments, the second angle "A2" and the length "LP3" of the third portion 412 of the first bent plate 402 may be based on the degree of movement of the first bent plate 402 between the open position and the close position. More specifically, the second angle "A2" and the length "LP3" may be such that the third portion 412 may contact the second half section 313 on the second side 306 of the first flat plate 302 at the maximum pivotal angle "M".

Referring to FIG. 10, the second hinge assembly 210 includes a configuration substantially similar to the configuration of the first hinge assembly 208. The second hinge assembly 210 includes a second flat plate 1002. The second flat plate 1002 includes a substantially flat and rectangular configuration defining a third central axis C-C' and a width "WF2" thereof. The second flat plate 1002 defines a first side 1004 and a second side 1006 opposite the first side 1004, and defines a thickness "TF2" therebetween. The second flat plate 1002 also defines a first half section 1012 and a second half section 1013 thereof. The second flat plate 1002 also includes a third slot 1008 extending substantially along the width. "WF2" of the second flat plate 1002. The third slot 1008 includes a third inner surface 1018 and a fourth inner surface 1020. The third slot 1008 defines a width "WS3" and a height "HS3" thereof.

In the illustrated embodiment, the third slot 1008 extends from an edge 1010 of the second flat plate 1002 substantially up to the third central axis C-C'. In other embodiments, an actual width "WS3" of the third slot 1008 may vary, based on application requirements. Also, the third slot 1008 is disposed substantially perpendicular with respect to the third central axis C-C'. In the illustrated embodiment, the third slot 1008 is located in the second half section 1013 of the second flat plate 1002 defining a third length "L3" and a fourth length "L4" of the second flat plate 1002. In other embodiments, the location of the third slot 1008 in the second flat plate 1002 may vary, based on application requirements.

The second flat plate 1002 further includes one or more third holes 1014 provided therein. The third holes 1014 are adapted to receive third fasteners 1016 therein in order to mount the second flat plate 1002 to the frame 102 of the machine 100. In some embodiments (shown in FIG. 16), the second flat plate 1002 may be mounted to the frame 102 of the machine 100 using a second mounting plate 1604. In such a situation, the third holes 1014 may be provided on the second mounting plate 1604, and the second mounting plate 1604 may be mounted to the frame 102 using the third fasteners 1016.

Figure 11:
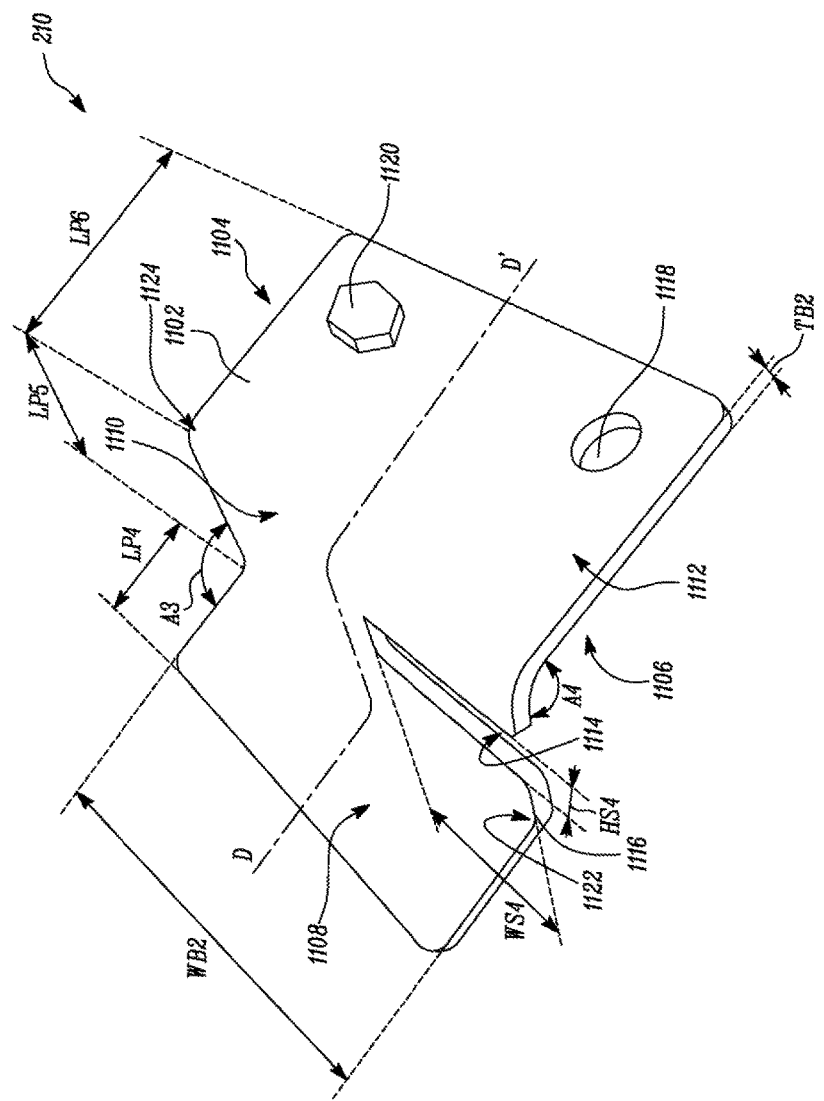
FIG. 11 is a perspective view of another portion of the second hinge assembly of FIG. 10, according to one embodiment of the present disclosure.

Referring to FIG. 11, a second bent plate 1102 of the second hinge assembly 210 is illustrated. The second bent plate 1102 includes a substantially angled and rectangular configuration defining a fourth central axis D-D' and a width "WB2" thereof. The second bent plate 1102 includes a first side 1104 and a second side 1106 opposite the first side 1104, and defines a thickness "TB2" therebetween. The second bent plate 1102 also includes a fourth portion 1108, a fifth portion 1110, and a sixth portion 1112. The fourth portion 1108 defines a length "LP4" thereof.

The fifth portion 1110 is connected to and extends away from the fourth portion 1108, and defines a third transition region 1122 therebetween. The fifth portion 1110 defines a length "LP5" thereof. Also, the fifth portion 1110 is inclined at a third angle "A3" with respect to the fourth portion 1108. The sixth portion 1112 is connected to and extends away from the fifth portion 1110, and defines a fourth transition region 1124. The sixth portion 1112 defines a length "LP6" thereof. Also, the sixth portion 1112 is inclined at a fourth angle "A4" with respect to the fifth portion 1110. In some embodiments (not shown), the sixth portion 1112 may be coplanar with respect to the fifth portion 1110 such that the fourth angle "A4" may be approximately 180°, based on application requirements. In the illustrated embodiment, the fourth angle "A4" is substantially equal to the third angle "A3".

As such, the sixth portion 1112 is substantially parallel with respect to the fourth portion 1108. In other embodiments, the fourth angle "A4" may vary with respect to the third angle "A3", based on application requirements. The second bent plate 1102 also includes a fourth slot 1114 provided in the fifth portion 1110 and extending substantially along the width "WB2" of the second bent plate 1102. The fourth slot 1114 defines a width "WS4" and a height "HS4" thereof. In the illustrated embodiment, the fourth slot 1114 extends from an edge 1116 of the fifth portion 1110 of the second bent plate 1102 substantially up to the fourth central axis D-D'.

In other embodiments, an actual width "WS4" of the fourth slot 1114 may vary, based on application requirements. Also, the fourth slot 1114 is disposed substantially perpendicular with respect to the fourth central axis D-D'. The second bent plate 1102 further includes one or more fourth holes 1118 provided in the sixth portion 1112. The fourth holes 1118 are adapted to receive fourth fasteners 1120 therein in order to mount the second bent plate 1102 to the guard plate 206 via the sixth portion 1112.

Figure 12:
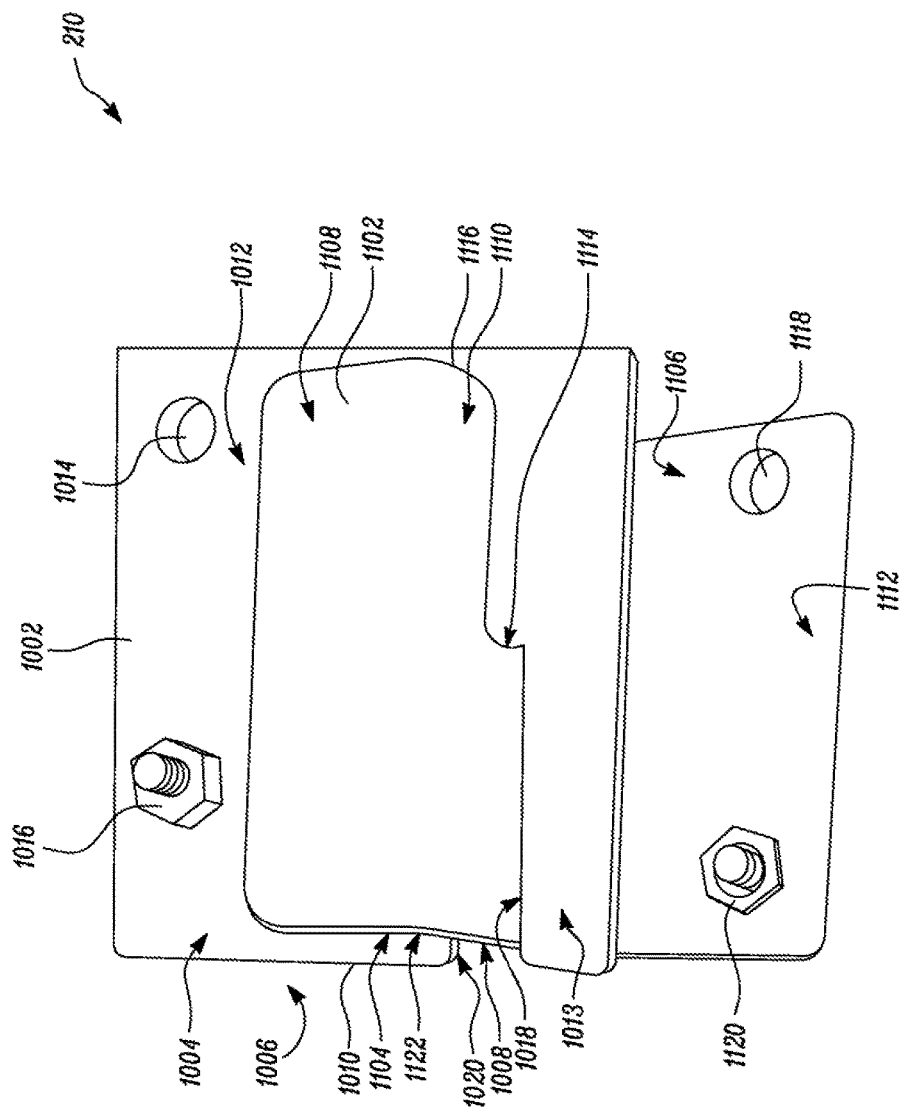
FIG. 12 is a front perspective view of the second hinge assembly of FIGS. 10 and 11 in an interconnected position, according to one embodiment of the present disclosure.
Figure 13:
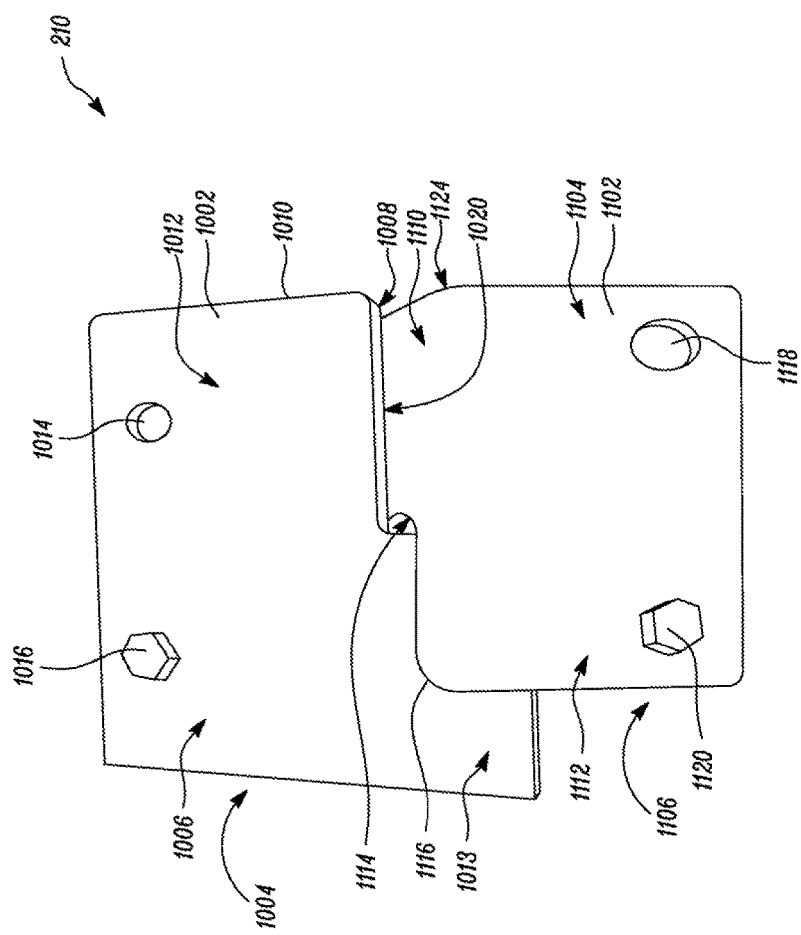
FIG. 13 is a rear perspective view of the second hinge assembly of FIG. 12, according to one embodiment of the present disclosure.

Referring to FIGS. 12 and 13, different views of the second hinge assembly 210 in an interconnected position are illustrated. Each of the third slot 1008 of the second flat plate 1002 and the fourth slot 1114 of the second bent plate 1102 is interconnected with respect to one another in order to form the second hinge assembly 210. In the interconnected position, the second bent plate 1102 extends between each of the first side 1004 and the second side 1006 of the second flat plate 1002. More specifically, in the interconnected position, each of the fourth portion 1108 and the third transition region 1122 of the second bent plate 1102 is disposed adjacent to and in association with the first half section 1012 on the first side 1004 of the second flat plate 1002.

Also, in the interconnected position, the fifth portion 1110 of the second bent plate 1102 is disposed within the third slot 1008 such that the third inner surface 1018 of the third slot 1008 is adapted to contact the fifth portion 1110 on the second side 1106 of the second bent plate 1102. The fourth slot 1114 is disposed in association with each of the first side 1004 and the second side 1006 of the second flat plate 1002. Further, in the interconnected position, each of the sixth portion 1112 and the fourth transition region 1124 of the second bent plate 1102 is disposed adjacent to and in association with the second half section 1013 on the second side 1006 of the second flat plate 1002.

One of the second flat plate 1002 and the second bent plate 1102 is adapted to pivotally move with respect to the other through each of the third slot 1008 and the fourth slot 1114 respectively. Accordingly, the second hinge assembly 210 is adapted to pivotally move between an open position and a close position as described in relation to the first hinge assembly 208 with reference to FIGS. 7 and 8. It should be noted that the second hinge assembly 210, including the second flat plate 1002 and the second bent plate 1102, includes a structural, dimensional, and operational configuration substantially similar to a structural, dimensional, and operational configuration of the first hinge assembly 208, including the first flat plate 302 and the first bent plate 402 respectively.

Figure 14:
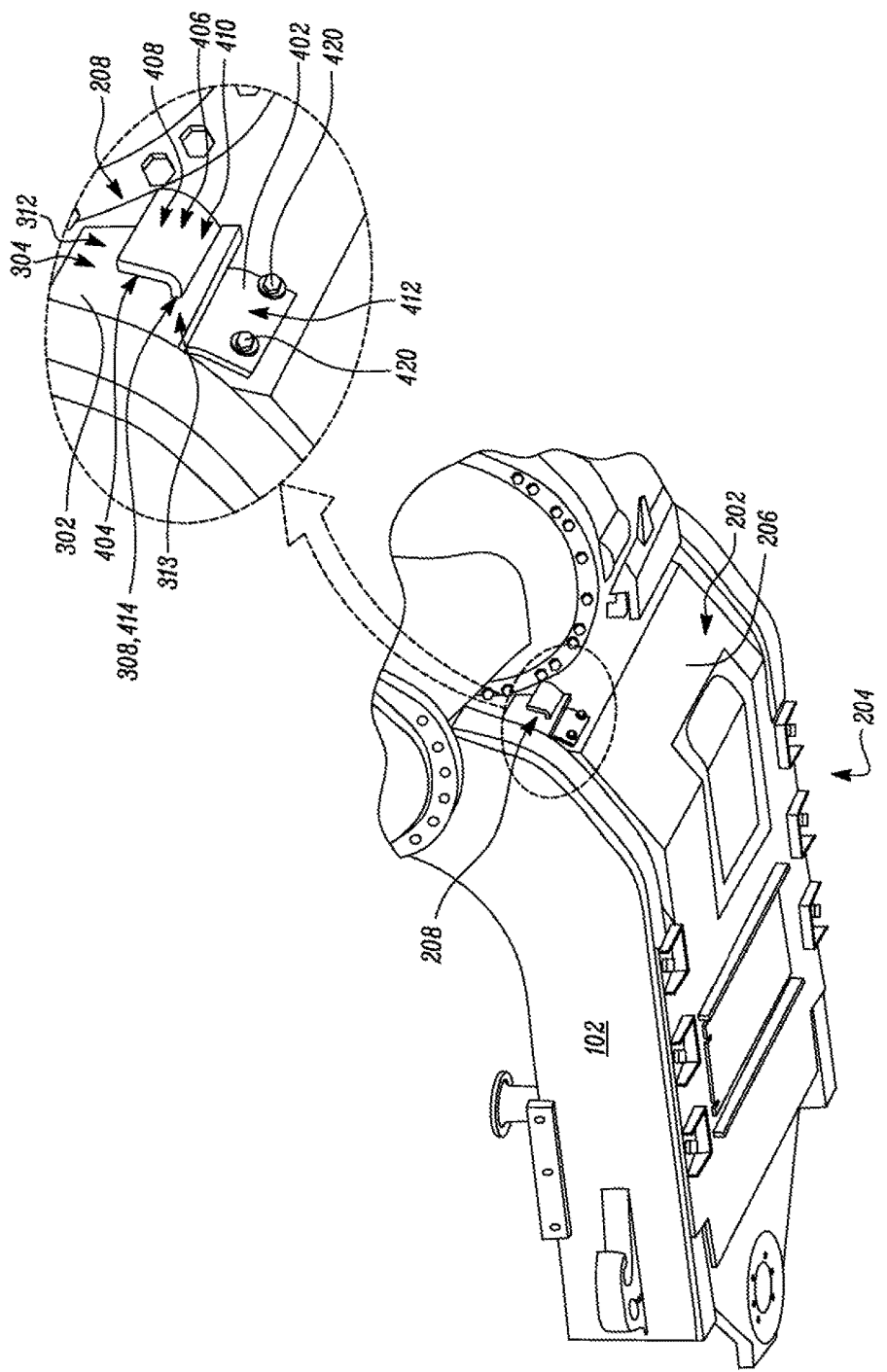
FIG. 14 is a partial perspective view of the first hinge assembly of FIG. 5 installed on the machine of FIG. 1, according to one embodiment of the present disclosure.
Figure 15:
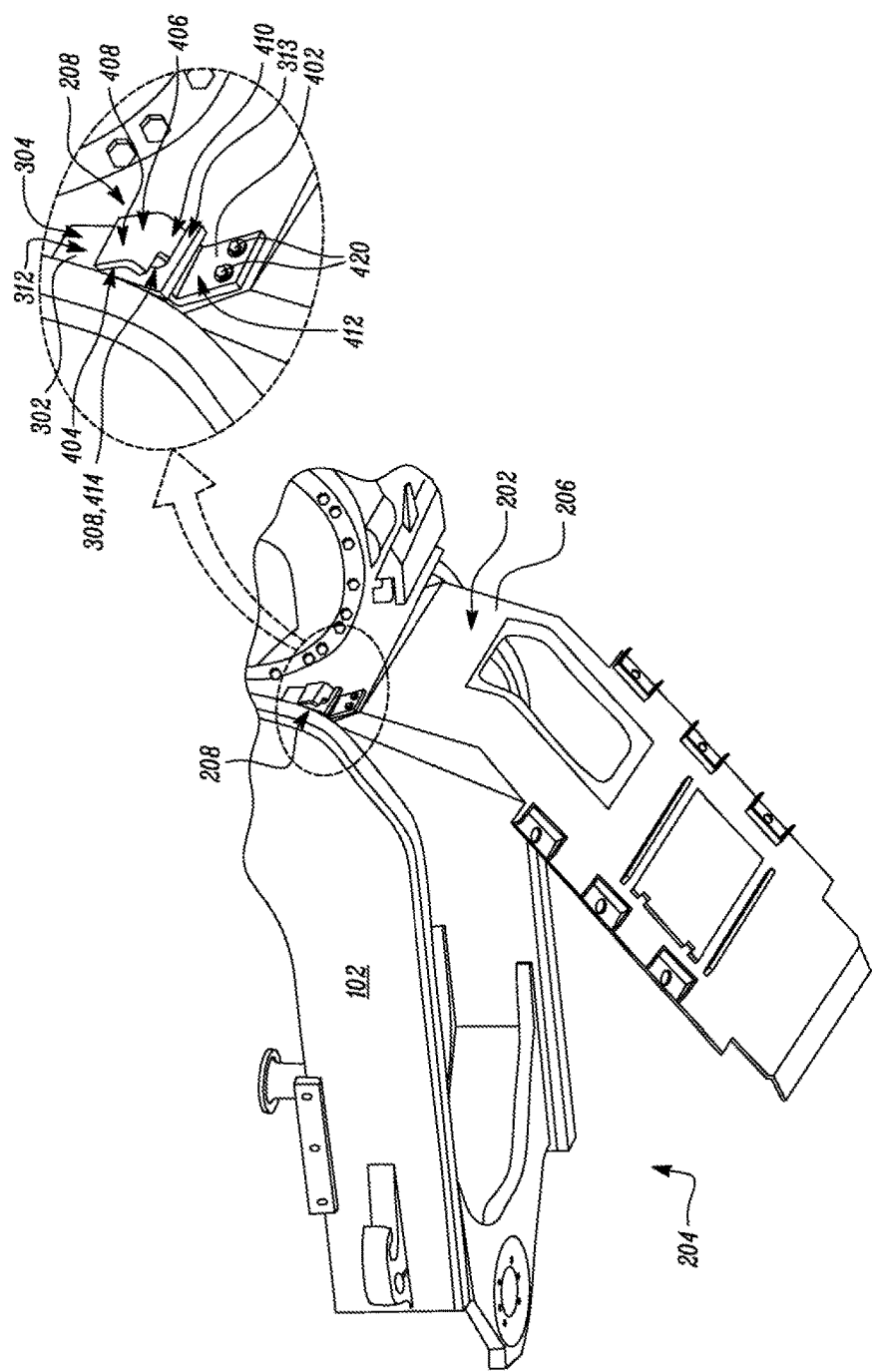
FIG. 15 is another partial perspective view of the first hinge assembly of FIG. 5 installed on the machine of FIG. 1, according to one embodiment of the present disclosure.

Referring to FIGS. 14 and 15, the first hinge assembly 208 is shown installed on the machine 100. For the purpose of explanation and clarity, only the first hinge assembly 208 is show. It should be noted that the second hinge assembly 210 may be installed on the machine 100 in a similar manner as that of the first hinge assembly 208. More specifically, in the illustrated embodiment, the first flat plate 302 is mounted to the frame 102 of the machine 100 via the first fasteners 316. Also, the first bent plate 402 is mounted to the guard plate 206 via the second fasteners 420. In other embodiments, based on application requirements, the first flat plate 302 may be interchangeably mounted to the guard plate 206 and the first bent plate 402 may be interchangeably mounted to the frame 102 of the machine 100.

Further, the first flat plate 302 and the first bent plate 402 is interconnected with one another via the interconnection of the first slot 308 and the second slot 414 with one another respectively. As show in FIG. 14, each of the guard plate 206 and the first hinge assembly 208 is in the close position, and a position of the first hinge assembly 208 corresponds to the close position of the first hinge assembly 208 as described with reference to FIG. 8. As shown in FIG. 15, the first bent plate 402 is pivotally moved with respect to first flat plate 302 in order to move each of the guard plate 206 and the first hinge assembly 208 in the open position. A position of the first hinge assembly 208 corresponds to the open position of the first hinge assembly 208 as described with reference to FIG. 7.

INDUSTRIAL APPLICABILITY

The present disclosure relates to a method 2000 of pivotally mounting the guard plate 206 to the frame 102 of the machine 100 using the first hinge assembly 208 and the second hinge assembly 210. Referring to FIG. 20, a flowchart of the method 2000 is illustrated. The method 2000 will now be described with reference to FIGS. 16 to 19. At step 2002, and referring to FIG. 16, the first flat plate 302 is mounted to the frame 102 of the machine 100. More specifically, in the illustrated embodiment, the first flat plate 302 is mounted to the frame 102 of the machine 100 using the first mounting plate 1602 and the first fasteners 316. In other embodiments, the first flat plate 302 may be directly mounted to the frame 102 of the machine 100 using the first fasteners 316.

Also, the second flat plate 1002 is mounted to the frame 102 of the machine 100. More specifically, in the illustrated embodiment, the second flat plate 1002 is mounted to the frame 102 of the machine 100 using the second mounting plate 1604 and the third fasteners 1016. In other embodiments, the second flat plate 1002 may be directly mounted to the frame 102 of the machine 100 using the third fasteners 1016. Also, in other embodiments, each of the first flat plate 302 and the second flat plate 1002 may be optionally mounted to the guard plate 206.

Figure 17:
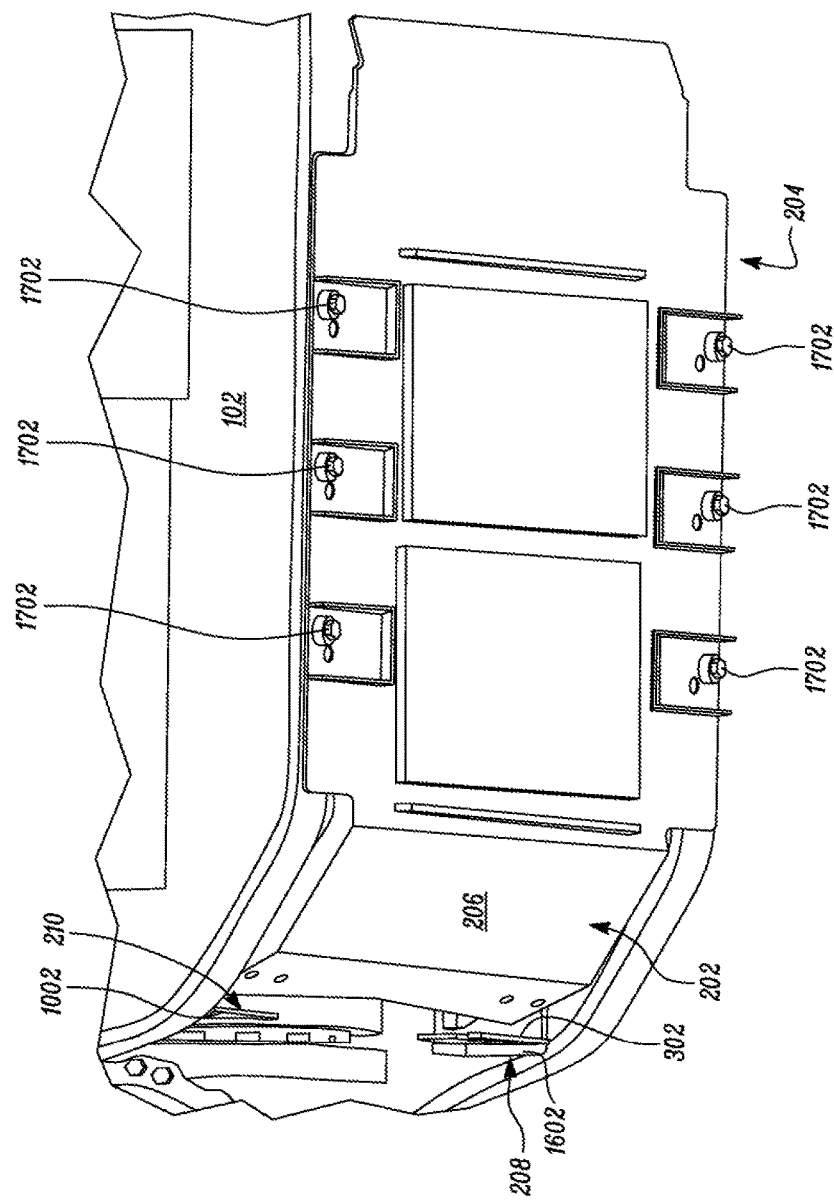
FIG. 17 is the partial perspective view of the bottom portion of the machine of FIG. 16 showing a guard plate installed thereon, according to one embodiment of the present disclosure.
Figure 18:
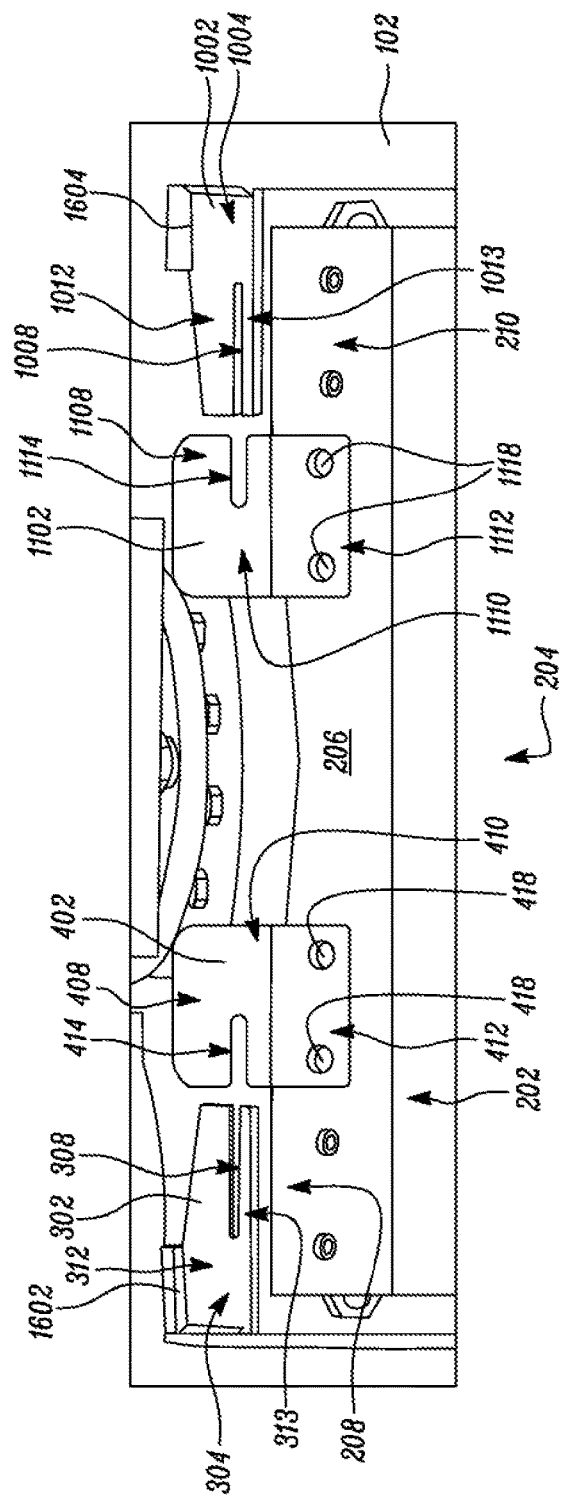
FIG. 18 is the partial perspective view of the bottom portion of the machine of FIG. 17 showing the other portion of the first hinge assembly of FIG. 4 and the other portion of the second hinge assembly of FIG. 11, according to one embodiment of the present disclosure.

At step 2004, and referring to FIG. 17, the guard plate 206 is removably mounted to the frame 102 of the machine 100. The guard plate 206 is mounted to the frame 102 via one or more guard fasteners 1702, such as bolts, screws, pins, plugs, clamps, and so on. At step 2006, and referring to FIG. 18, the first slot 308 of the first flat plate 302 is slidably interconnected with respect to the second slot 414 of the first bent plate 402. As such, the first portion 408 of the first bent plate 402 is disposed, adjacent to the first side 304 of the first flat plate 302. Also, the second portion 410 of the first bent plate 402 is disposed within the first slot 308 of the first flat plate 302. Further, the third portion 412 of the first bent plate 402 is disposed adjacent to the second side 306 of the first flat plate 302.

Also, the third slot 1008 of the second flat plate 1002 is slidably interconnected with respect to the fourth slot 1114 of the second bent plate 1102. As such, the fourth portion 1108 of the second bent plate 1102 is disposed adjacent to the first side 1004 of the second flat plate 1002. Also, the fifth portion 1110 of the second bent plate 1102 is disposed within the third slot 1008 of the second flat plate 1002. Further, the sixth portion 1112 of the second bent plate 1102 is disposed adjacent to the second side 1006 of the second flat plate 1002.

Figure 19:
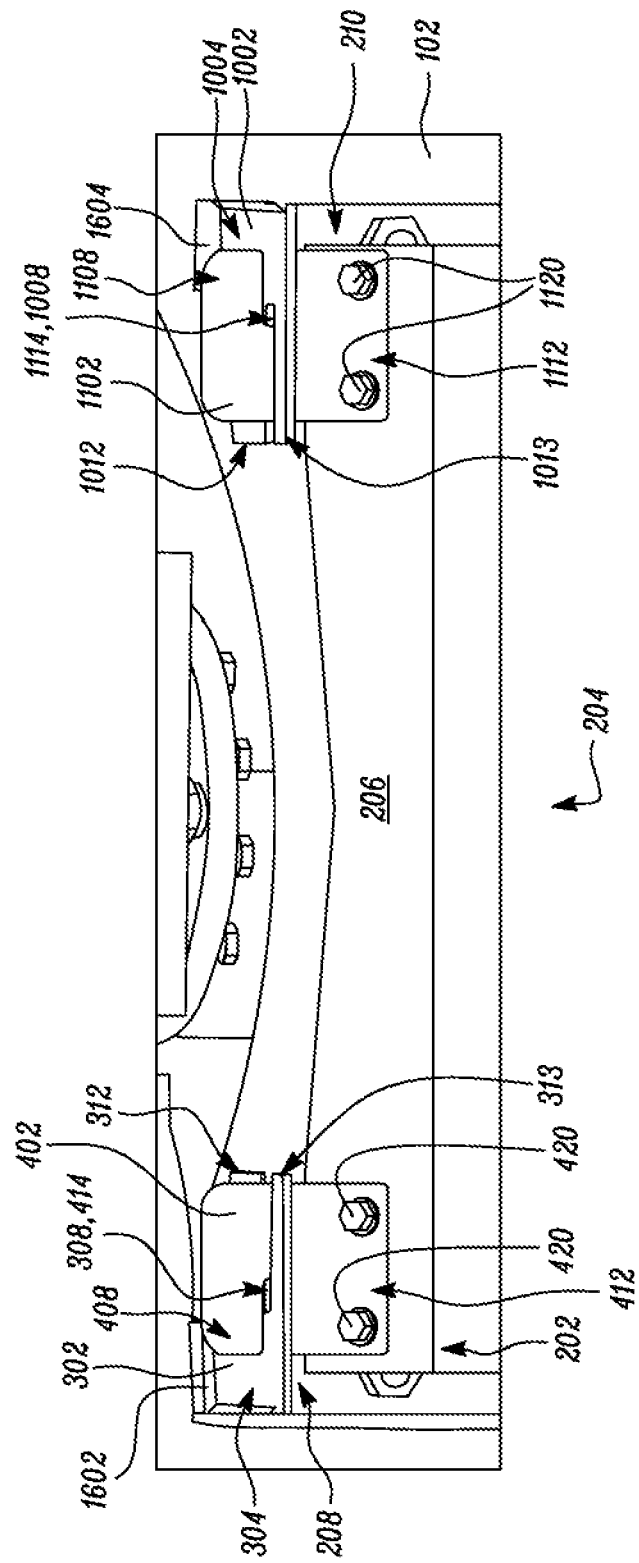
FIG. 19 is the partial perspective view of the bottom portion of the machine of FIG. 18 showing the first hinge assembly of FIG. 5 and the second hinge assembly of FIG. 12 installed thereon, according to one embodiment of the present disclosure.
Figure 20:
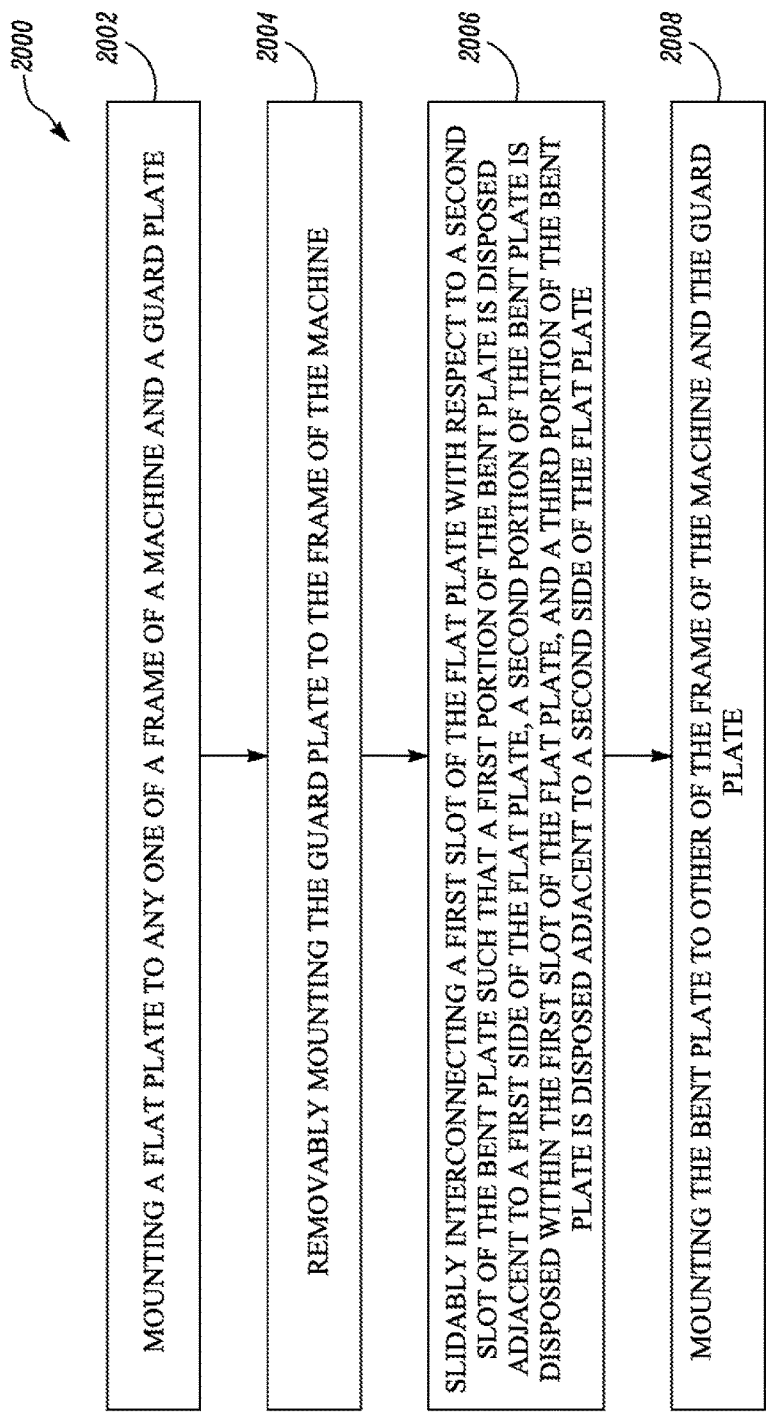
FIG. 20 is a flowchart illustrating a method of mounting the guard plate of FIG. 17 to the bottom portion of the machine of FIG. 1, according to one embodiment of the present disclosure.

At step 2008, and referring to FIG. 19, the first bent plate 402 is mounted to the guard plate 206 using the second fasteners 420. In a situation when the first flat plate 302 may be mounted to the guard plate 206, the first bent plate 402 may be mounted to the frame 102 of the machine 100. Also, the second bent plate 1102 is mounted to the guard plate 206 using the fourth fasteners 1120. In a situation when the second flat plate 1002 may be mounted to the guard plate 206, the second bent plate 1102 may be mounted to the frame 102 of the machine 100. Accordingly, each of the first hinge assembly 208, the second hinge assembly 210, and the guard plate 206 is mounted to the frame 102 of the machine 100 in the close position. In the close position, the second portion 410 of the first bent plate 402 is disposed substantially perpendicular with respect to the first flat plate 302, and the fifth portion 1100 of the second bent plate 1102 is disposed substantially perpendicular with respect to the second flat plate 1002.

Further, in order to pivotally move the guard plate 206 in the open position, the first bent plate 402 is pivotally moved with respect to the first flat plate 302. Also, the second bent plate 1102 is pivotally moved with respect to the second flat plate 1002 in order to pivotally move the guard plate 206 in the open position. In the open position of the first hinge assembly 208, the first portion 408 of the first bent plate 402 contacts the first half section 312 on the first side 304 of the first flat plate 302. Also, in the open position of the second hinge assembly 210, the fourth portion 1108 of the second bent plate 1102 contacts the first half section 1012 on the first side 1004 of the second flat plate 1002.

The first hinge assembly 208 and the second hinge assembly 210 provide a simple, effective, and cost-efficient method of pivotally mounting the guard plate 206 to the frame 102 of the machine 100. The first hinge assembly 208 and the second hinge assembly 210 include a simple design and may be manufactured with minimum effort and within limited duration using simple manufacturing techniques, such as stamping, bending, and so on. Also, the first hinge assembly 208 and the second hinge assembly 210 may be mounted to the frame 102 of the machine 100 and/or the guard plate 206 using simple mounting techniques and mounting components. The first hinge assembly 208 and the second hinge assembly 210 may be retrofitted in any machine with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A hinge assembly comprising:
a flat plate defining a first side and a second side disposed opposite to the first side, the flat plate including a first slot extending at least partially along a width of the flat plate, the first slot disposed substantially perpendicular with respect to a central axis of the flat plate; and
a bent plate defining a first side and a second side disposed opposite to the first side, the bent plate extending between each of the first side and the second side of the flat plate, the bent plate including:
a first portion;
a second portion extending away from the first portion and defining a first transition region therebetween, the second portion being inclined at a first angle with respect to the first portion, the second portion including a second slot extending at least partially along a width of the bent plate, the second slot disposed substantially perpendicular with respect to a central axis of the bent plate, the second slot adapted to interconnect with respect to the first slot provided in the flat plate to pivotally move one of the bent plate and the flat plate with respect to the other between an open position and a close position; and
a third portion extending away from the second portion and defining a second transition region therebetween, the third portion being inclined at a second angle with respect to the second portion,
wherein, in the open position, the first portion of the bent plate is adapted to, at least partially, contact a first half section on the first side of the flat plate.

2. The hinge assembly of claim 1, wherein, in the open position:
the first transition region is disposed adjacent to the first half section on the first side of the flat plate, and
the second transition region is disposed adjacent to a second half section on the second side of the flat plate.

3. The hinge assembly of claim 1, wherein, in the close position, the second portion of the bent plate is substantially perpendicular with respect to the flat plate.

4. The hinge assembly of claim 1, wherein the third portion of the bent plate is substantially parallel with respect to the first portion of the bent plate.

5. The hinge assembly of claim 1, wherein:
a first inner surface of the first slot of the flat plate is adapted to, at least partially, contact the second portion on the second side of the bent plate in each of the open position and the close position, and a second inner surface of the first slot of the flat plate is adapted to, at least partially, contact the second portion on the first side of the bent plate in the open position.

6. The hinge assembly of claim 1, wherein:
the first slot extends from an edge of the flat plate up to the central axis of the flat plate, and
the second slot extends from an edge of the bent plate up to the central axis of the bent plate.

7. The hinge assembly of claim 1, wherein the first slot is disposed in a second half section of the flat plate.

8. A guard assembly for a machine, the guard assembly comprising:
a guard plate adapted to be pivotally coupled to a frame of the machine; and
at least one hinge assembly adapted to pivotally couple the guard plate to the frame of the machine, the at least one hinge assembly comprising:
a flat plate adapted to be coupled to any one of the frame and the guard plate, the flat plate defining a first side and a second side disposed opposite to the first side, the flat plate including a first slot extending at least partially along a width of the flat plate, the first slot disposed substantially perpendicular with respect to a central axis of the flat plate; and
a bent plate adapted to be coupled to other of the frame and the guard plate, the bent plate defining a first side and a second side disposed opposite to the first side, the bent plate extending between each of the first side and the second side of the flat plate, the bent plate including:
a first portion;
a second portion extending away from the first portion and defining a first transition region therebetween, the second portion being inclined at a first angle with respect to the first portion, the second portion including a second slot extending at least partially along a width of the bent plate, the second slot disposed substantially perpendicular with respect to a central axis of the bent plate, the second slot adapted to interconnect with respect to the first slot provided in the flat plate to pivotally move one of the bent plate and the flat plate with respect to the other between an open position and a close position; and
a third portion extending away from the second portion and defining a second transition region therebetween, the third portion being inclined at a second angle with respect to the second portion, wherein, in the open position, the first portion of the bent plate is adapted to, at least partially, contact a first half section on the first side of the flat plate.

9. The guard assembly of claim 8, wherein the flat plate is coupled to any one of the frame and the guard plate through the first half section using at least one first fastener, the at least one first fastener being disposed in the first half section such as to limit interference with respect to the first portion of the bent plate in the open position.

10. The guard assembly of claim 8, wherein the bent plate is coupled to other of the frame and the guard plate through the third portion using at least one second fastener, the at least one second fastener being disposed in the third portion such as to limit interference with respect to the second half section of the flat plate in the open position.

11. The guard assembly of claim 8, wherein, in the open position:
the first transition region is disposed adjacent to the first half section on the first side of the flat plate, and
the second transition region is disposed adjacent to a second half section on the second side of the flat plate.

12. The guard assembly of claim 8, wherein, in the close position, the second portion of the bent plate is substantially perpendicular with respect to the flat plate.

13. The guard assembly of claim 8, wherein the third portion of the bent plate is substantially parallel with respect to the first portion of the bent plate.

14. The guard assembly of claim 8, wherein:
a first inner surface of the first slot of the flat plate is adapted to, at least partially, contact the second portion on the second side of the bent plate in each of the open position and the close position, and
a second inner surface of the first slot of the flat plate is adapted to, at least partially, contact the second portion on the first side of the bent plate in the open position.

15. The guard assembly of claim 8, wherein:
the first slot extends from an edge of the flat plate up to the central axis of the flat plate, and
the second slot extends from an edge of the bent plate up to the central axis of the bent plate.

16. The guard assembly of claim 8, wherein the first slot is disposed in a second half section of the flat plate.

17. A method of pivotally mounting a guard plate to a frame of a machine using at least one hinge assembly, the at least one hinge assembly including a flat plate and a bent plate, the method comprising:
mounting the flat plate to any one of the frame of the machine and the guard plate;
mounting, removably, the guard plate to the frame of the machine;
interconnecting, slidably, a first slot of the flat plate with respect to a second slot of the bent plate such that a first portion of the bent plate is disposed adjacent to a first side of the flat plate, a second portion of the bent plate is disposed within the first slot of the flat plate, and a third portion of the bent plate is disposed adjacent to a second side of the flat plate; and
mounting the bent plate to other of the frame of the machine and the guard plate.

18. The method of claim 17, wherein interconnecting further includes disposing the second portion of the bent plate substantially perpendicular with respect to the flat plate.

19. The method of claim 17 further includes pivotally moving one of the bent plate and the flat plate with respect to the other to pivotally move the guard plate between an open position and a close position.

20. The method of claim 19 further includes contacting, at least partially, the first portion of the bent plate with respect to a first half section on the first side of the flat plate in the open position.

* * * * *